Patented June 2, 1931

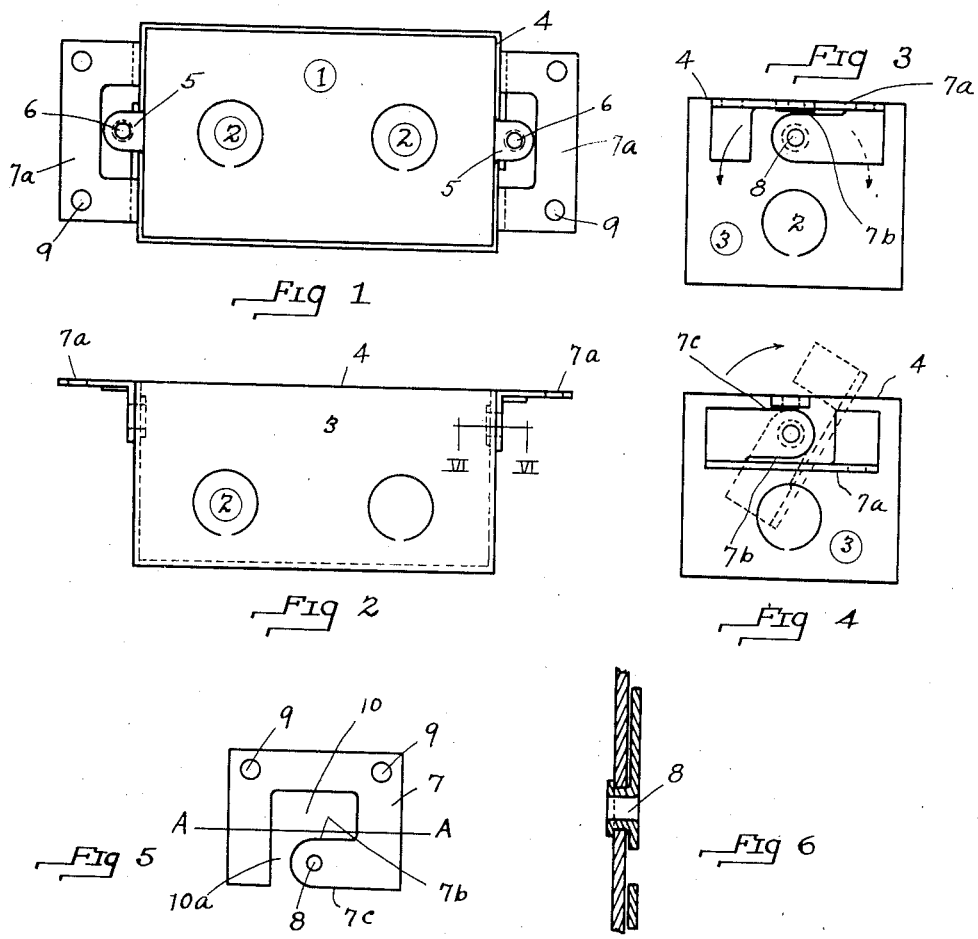

1,808,050

UNITED STATES PATENT OFFICE

JOHN E. MAIR, OF MARS, PENNSYLVANIA, ASSIGNOR TO NATIONAL ELECTRIC PRODUCTS CORPORATION, A CORPORATION OF DELAWARE

SWITCH BOX

Application filed February 7, 1930. Serial No. 426,562.

My invention relates to switch boxes, and particularly to the means which are secured to such boxes for attaching them to building structures.

A switch box consists essentially of a housing in which receptacles, plugs, or other electrical devices, such as a switch, may be secured to form a part of an electrical circuit. One face of the box is open to permit the introduction of one or the other of such electrical devices, and the side walls of the box terminate in a peripheral edge around this opening. Means are secured adjacent this peripheral edge for attaching the box in the wall or other portion of a building to which the device is to be secured. In general, there are two modes of attaching a switch box. In one case the box is inset in the wall, the edge of the box being flush with the surface of the wall. In such case the attaching means (so-called supporting ears) extend flush with the edge of the box. In the other case the edge of the box is arranged to project from the plane of the surface of the wall to which the box is attached, in order that the wall covering (such as plaster) when it is applied will be flush with the said edge. It is, therefore, necessary in the latter case that the supporting ears extend from the side walls of the box in a plane which is offset from the edge of the box. That is to say, the supporting flanges of the ears will not extend flush with the peripheral edge of the box, but will be spaced therefrom in correspondence with the projection of the edge of the box.

Hitherto, supporting ears have been made detachable from the switch box so that they could be appropriately organized to serve in one or the other of the above outlined conditions of installation. To overcome several disadvantages incident to such detachable supporting ears, I provide box-supporting members which are preferably secured permanently to the box, and are adapted to be adjusted in one of several positions to meet each condition of installation. Simplicity of construction, and ease of operation are other objects in view. Upon remarking that my supporting members may be as well employed on outlet boxes, junction boxes, and the like, I proceed with the description of an embodiment of the invention.

In the accompanying drawings Fig. 1 is a plan view of the switch box, showing the open face of the box and my supporting members associated therewith. Fig. 2 is a view in side elevation of the switch box. Fig. 3 is a view in end elevation, showing one of the supporting members arranged in such position as to secure the box flush within a wall; and Fig. 4 is a similar view, showing a supporting member in position to secure the switch box to a wall, with the edge of the box projecting or lying without the surface of the wall. Fig. 5 is a view in plan of the formed blank which is shaped to provide a supporting member. Fig. 6 is a view in cross-section on the line VI—VI of Fig. 2, and to larger scale, illustrating a convenient manner of securing a supporting member to the switch box.

Referring to the drawings the body of the box may be of any common or suitable form, having a floor 1 with the usual knockout openings 2 for the introduction of electric conduits, and a peripheral side wall 3 which, in this case, is rectangular. The side wall extends from the floor 1 and forms a peripheral edge 4 around the open top or face of the box. Extending outward from the edge 4 are oppositely disposed lugs 5 which are provided with threaded holes 6, affording means for securing a cover or face plate to the box. As will presently appear, these lugs 5 co-operate with the supporting ears of the box.

In Fig. 5 there is illustrated a typical blank 7 of which the supporting ears are formed. The blank is bent on the line A—A to a right angled section to form a supporting ear, and, as may be seen in Fig. 2, two supporting ears or members are pivotally secured to the side wall of the box. Conveniently, the metal of the blank, adjacent the hole 8, may be extruded to extend through a suitable hole in the wall of the box, and upset on the inner surface of the wall of the box (shown in cross-section in Fig. 6) to afford the desired pivotal attachment. The portion of the blank lying above the line A—A forms the flange or shelf 7a of the formed supporting ear, and in this portion a plurality of holes 9 is provided for the reception of screws, nails, or other means for attaching the box to a wall or other supporting structure, while the remaining portion of the blank forms the tail-piece which is rotatably pivoted to the box wall through the hole 8.

It will be noted that the blanks 7 are each cut-out to form an opening 10, and that the opening forms in assembly a recess to include the lug 5 with which it is associated. Figs. 1 to 3 illustrate the position of the uppporting ears for one condition of installation; that is, for installation flush with a wall of flat surface. In this case the flanges 7a of the supporting members are in such of their alternative positions as to lie flush with the peripheral edge 4 of the box, and flush with the lugs 5. The supporting members are provided with two lug-engaging portions or edges 7b and 7c, and, in this position (Figure 3) the edge 7b of each supporting member engages the nether surface of its associated lug 5. The lugs 5 serve as stops to position the supporting ears, as illustrated in Figs. 1 to 3. One supporting member 7 is so positioned relatively to its associated lug 5 as to prevent rotation in a counter clockwise direction, while the opposed member 7 is so organized as to prevent rotation in the opposite sense. That is to say, the supporting member on the right-hand side of the box cannot be rotated in the direction of the full-line arrow in Fig. 3, and the opposed supporting member on the left-hand side of the box cannot be rotated in the direction of the dotted line arrow (Fig. 3). Manifestly, when the supporting flanges 7a are secured to a building or supporting structure, the box is prevented from turning about the points at which the supporting members are pivotally attached to the box. The opposed supporting members 7 and their associated lugs 5 co-operate to prevent such turning, and this feature is of the essence of my invention.

Before the box is secured to a supporting structure the members 7 may, however, be rotated in opposite directions, and in directions reverse to the arrows of Fig. 3, to bring them to their alternative position which is indicated in Fig. 4. In such position the flanges 7a lie below the peripheral edge 4 of the box to adapt the supporting members to the second condition of installation. In such case, it will be recalled, the edge 4 projects from the surface of the supporting structure or wall to which the box is secured. It will be noted that opening 10, formed in each blank 7, is peculiar in respects other than those mentioned. That is, a slot or neck 10a forms part of the opening, and this neck affords the member 7 clearance to pass the adjacent lug 5 in moving from one alternative position to another. It is to be remarked that in the second position—the position wherein the flange 7a lies below the edge 4—the edge 7c of the supporting member lies against its associated lug 5, and so the members 7 and their associated lugs 5 co-operate one with the other (and in a manner similar to that described in connection with the first mentioned condition) to prevent rotation of the box when it is in mounted position.

It is noteworthy that to move the box-supporting members of my invention from one alternative position to another, no screws or nuts need be loosened, or tightened, as has been necessary in the structures which were employed heretofore. My invention reduces the cost of manufacturing boxes with which adjustable supporting members are combined, since the tapping of several screw holes and the accompanying use of screws is dispensed with. Workman's time is saved in making the adjustment—a mere twist of the supporting member without the use of tools is sufficient.

I claim as my invention:

1. The combination with a switch-box having a cover-attaching lug projecting outwardly from its side wall, of a two-position box-supporting member comprising a tail-piece bearing against and rotatably pivoted to said box wall and an outwardly projecting shelf, an opening in said shelf containing said lug when said member is in one position, and a slot extending from said shelf-opening through said tail-piece adapted to permit said tailpiece to pass said lug upon rotation of said member to its other position.

2. In a switch box having a peripheral wall, the combination of a cover-attaching lug projecting angularly from said wall, a two-position box-supporting member rotatably pivoted to said wall, and lug-engaging portions on said supporting member, each of which portions is alternately adapted to bear against the nether surface of said attaching lug, whereby, by the bearing of either of said portions against said nether surface of the lug, the supporting member is located in one or the other of its said alternate positions.

3. In a switch box having a peripheral wall, the combination of a cover-attaching lug projecting angularly from said wall, a two-position box-supporting member rotatably pivoted to said wall at a point beneath said lug and in alignment therewith, and lug-engaging portions on said supporting member, each of which portions is alternately adapted to bear against the nether surface of said attaching lug, whereby, by the bearing of either of said portions against said nether surface of the lug, the supporting member is located in one or the other of its said alternate positions.

4. In a switch box having a peripheral wall, the combination of two cover-attaching lugs projecting outwardly from opposite faces of said peripheral wall, a two-position box-supporting member associated with each of said attaching lugs, each of which supporting members is rotatably pivoted to said wall at a point below its associated lug, and lug engaging portions on said supporting members, each of which lug-engaging portions is alternately adapted to bear against the nether surface of the adjacent cover-attaching lug, whereby, by the bearing of either of said portions against said nether surface of the lug, each supporting member is located in one or the other of its said alternate positions.

In testimony whereof I have hereunto set my hand.

JOHN E. MAIR.